United States Patent
Asano

(10) Patent No.: US 10,759,679 B2
(45) Date of Patent: Sep. 1, 2020

(54) FLUID STERILIZATION DEVICE

(71) Applicant: Nikkiso Co., Ltd, Tokyo (JP)

(72) Inventor: Hideki Asano, Ishikawa (JP)

(73) Assignee: Nikkiso Co., Ltd., Tokyo (JP)

( * ) Notice: Subject to any disclaimer, the term of this patent is extended or adjusted under 35 U.S.C. 154(b) by 0 days.

(21) Appl. No.: 16/160,582

(22) Filed: Oct. 15, 2018

(65) Prior Publication Data

US 2019/0112203 A1 Apr. 18, 2019

(30) Foreign Application Priority Data

Oct. 17, 2017 (JP) .................................. 2017-201098

(51) Int. Cl.
*C02F 1/32* (2006.01)

(52) U.S. Cl.
CPC ........ *C02F 1/325* (2013.01); *C02F 2201/324* (2013.01); *C02F 2201/3222* (2013.01); *C02F 2201/3227* (2013.01); *C02F 2201/3228* (2013.01)

(58) Field of Classification Search
CPC .... C02F 1/32; C02F 1/325; C02F 2201/3227; C02F 2201/3228; C02F 2201/324
See application file for complete search history.

(56) References Cited

U.S. PATENT DOCUMENTS

| | | | | |
|---|---|---|---|---|
| 2002/0172627 A1* | 11/2002 | Aoyagi | ................... | A61L 2/084 422/186.3 |
| 2006/0231770 A1* | 10/2006 | Snowball | ................ | C02F 1/325 250/432 R |
| 2009/0208386 A1* | 8/2009 | Barsky | ...................... | C02F 1/30 422/186.3 |
| 2010/0242192 A1* | 9/2010 | Backman | ............ | B01F 7/00208 15/4 |
| 2016/0083272 A1* | 3/2016 | Rajagopalan | ........... | C02F 1/325 250/435 |

FOREIGN PATENT DOCUMENTS

JP 2011016074 A 1/2011

\* cited by examiner

*Primary Examiner* — Eliza W Osenbaugh-Stewart
(74) *Attorney, Agent, or Firm* — Muncy, Geissler, Olds & Lowe, P.C.

(57) ABSTRACT

A fluid sterilization device includes: a flow passage tube in which a processing passage where a passing fluid is sterilized is formed; an inflow passage or an outflow passage formed in the flow passage tube; a light source that irradiates the processing passage with ultraviolet light; and a rotating body provided in the processing passage. The rotating body is rotated around a longitudinal direction of the processing passage in response to a flow of the fluid passing through the processing passage and is configured to come into contact with an inner wall of the flow passage tube during rotation.

7 Claims, 1 Drawing Sheet

FLUID STERILIZATION DEVICE

CROSS-REFERENCE TO RELATED APPLICATIONS

This application is based upon and claims the benefit of priority from the prior Japanese Patent Application No. 2017-201098, filed on Oct. 17, 2017, the entire contents of which are incorporated herein by reference.

BACKGROUND OF THE INVENTION

1. Field of the Invention

The present invention relates to a fluid sterilization device.

2. Description of the Related Art

It is known that ultraviolet light has sterilization capability. Devices that radiate ultraviolet light are used for sterilization in medical and food processing fronts. Devices that sterilize a fluid such as water continuously by irradiating the fluid with ultraviolet light are also used. One example is a device in which an ultraviolet LED is provided on the inner wall at a pipe end of a flow passage formed by a straight metal pipe (see, for example, JP2011-16074 publication).

The inner wall of a pipe in an ultraviolet sterilization and water purification device like this may become stained as the device is used for a long period of time. The stain on the inner wall of the pipe may result in lower ultraviolet reflectivity on the inner wall and lower sterilization performance. It is therefore necessary to disassemble and clean the device periodically.

Disassembling and cleaning of the device makes it necessary to stop the device, involves a lot of effort, and so results in a long down time.

SUMMARY OF THE INVENTION

In this background, a purpose of the present invention is to provide a novel technology for reducing stain on the inner wall of the pipe while continuing to use a fluid sterilization device.

A fluid sterilization device according to an embodiment of the present invention includes: a flow passage tube in which a processing passage where a passing fluid is sterilized is formed; an inflow passage or an outflow passage formed in the flow passage tube; a light source that irradiates the processing passage with ultraviolet light; and a rotating body provided in the processing passage. The rotating body is rotated around a longitudinal direction of the processing passage in response to a flow of the fluid passing through the processing passage and is configured to come into contact with an inner wall of the flow passage tube during rotation.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
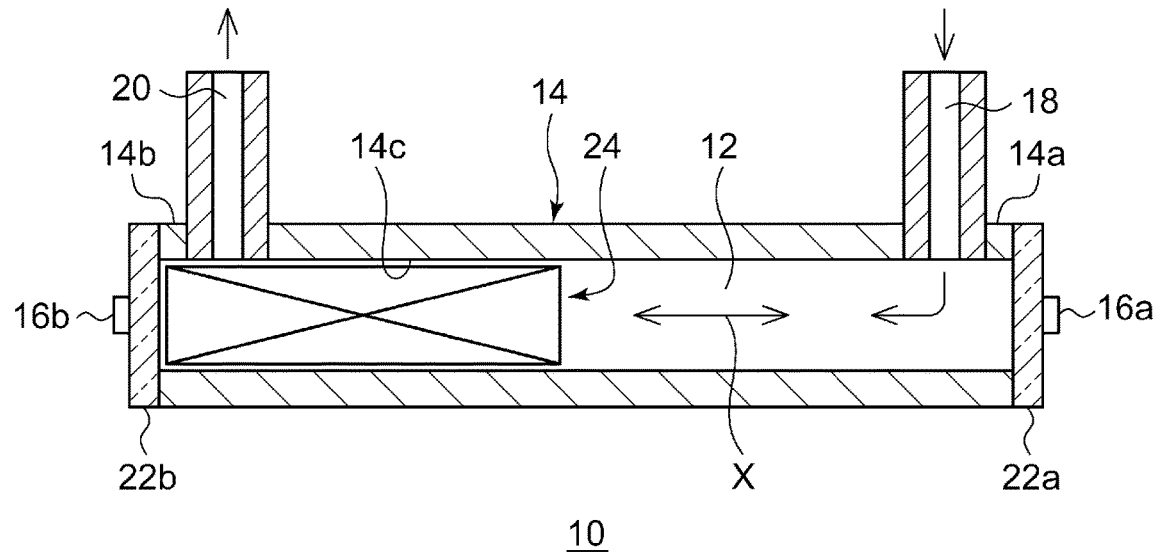
FIG. 1 is a cross-sectional view showing a schematic configuration of a fluid sterilization device according to an embodiment.

A fluid sterilization device according to an embodiment of the present invention includes: a flow passage tube in which a processing passage where a passing fluid is sterilized is formed; an inflow passage or an outflow passage formed in the flow passage tube; a light source that irradiates the processing passage with ultraviolet light; and a rotating body provided in the processing passage. The rotating body is rotated around a longitudinal direction of the processing passage in response to a flow of the fluid passing through the processing passage and is configured to come into contact with an inner wall of the flow passage tube during rotation.

According to this embodiment, the stain attached to an inner wall is removed as the rotating body is rotated and comes into contact with the inner wall of the flow passage tube.

The rotating body may include: a torque generator that generates a torque in response to a force received from the fluid; a passage channel in which the fluid passes from the inflow passage toward the outflow passage; and a contact part that comes into contact with the inner wall of the flow passage tube as the contact parts is rotated. This allow the stain on the inner wall to be removed while the device continues to be used.

The rotating body may be provided between the inflow passage and the outflow passage. This eliminates a need to provide an extra space other than the processing passage to accommodate the rotating body.

The rotating body may be made of an ultraviolet transmissive material selected from the group consisting of quartz ($SiO_2$), sapphire ($Al_2O_3$), and amorphous fluororesin. This prevents the rotating body from being degraded by ultraviolet light and inhibits the sterilization performance from being lowered due to absorption of ultraviolet light by the rotating body.

The rotating body may be made of an ultraviolet reflective material including, for example, aluminum (Al) or polytetrafluoroethylene (PTFE). This prevents the rotating body from being degraded by ultraviolet light and inhibits the sterilization performance from being lowered due to absorption of ultraviolet light by the rotating body.

The inner wall of the flow passage tube may be made of aluminum (Al) or polytetrafluoroethylene (PTFE). Using the same material to form the inner wall of the flow passage tube and the rotating body reduces the likelihood that damage is done as the rotating body comes into contact with the flow passage tube.

The rotating body may be configured such that a biasing force oriented at an angle to a direction of rotational axis is exerted in response to the flow of the fluid passing through the processing passage. This eliminates a need to provide a drive source for driving the rotating body.

Optional combinations of the aforementioned constituting elements, and implementations of the invention in the form of methods, apparatuses, and systems may also be practiced as additional modes of the present invention.

The invention will now be described by reference to the preferred embodiments. This does not intend to limit the scope of the present invention, but to exemplify the invention.

A description will be given of an embodiment of the present invention with reference to the drawings. In the explanations of the figures, the same elements shall be denoted by the same reference numerals, and duplicative explanations will be omitted appropriately. The configuration described below is by way of example only and does not limit the scope of the present invention.

[Fluid Sterilization Device]

FIG. 1 is a cross-sectional view showing a schematic configuration of a fluid sterilization device according to an embodiment. The fluid sterilization device 10 includes a straight tube 14 defining a processing passage 12 and light sources 16a, 16b for irradiating the interior of the straight tube 14 with ultraviolet light. An inflow passage 18 extending in the radial direction of the straight tube 14 is provided at one end 14a of the straight tube 14, and an outflow passage 20 extending in the radial direction of the straight tube 14 is provided at the other end 14b of the straight tube 14. A window 22a for transmitting the ultraviolet light from the light source 16a is provided on the one end 14a. A window 22b for transmitting the ultraviolet light from the light source 16b is provided on the other end 14b.

Each of the light sources 16a, 16b includes a light emitting device and a substrate. The light emitting device is a light emitting diode (LEDs) configured to emit ultraviolet light, and the central wavelength or peak wavelength thereof is included in a range of about 200 nm-350 nm. It is preferable that the light emitting device emit ultraviolet light near 260 nm-290 nm having a high sterilizing efficiency. Such an ultraviolet LED is exemplified by an aluminum gallium nitride (AlGaN) based LED.

A portion or the entirety of each of the windows 22a, 22b is made of a material having a high ultraviolet transmittance such as quartz ($SiO_2$), sapphire ($Al_2O_3$), and amorphous fluororesin.

The fluid flowing in from the inflow passage 18 in the fluid sterilization device 10 flows in the processing passage 12 in the axial direction (longitudinal direction) X of the straight tube 14 and flows out from the outflow passage 20.

Thus, the fluid sterilization device 10 according to the embodiment includes: the straight tube 14 as a flow passage tube in which the processing passage 12 where the passing fluid is sterilized is formed; the inflow passage 18 or the outflow passage 20 formed in the straight tube 14; the light sources 16a, 16b that irradiate the processing passage 12 with ultraviolet light; and a rotating body 24 provided in the processing passage 12.

(Rotating Body)

Figure 2:
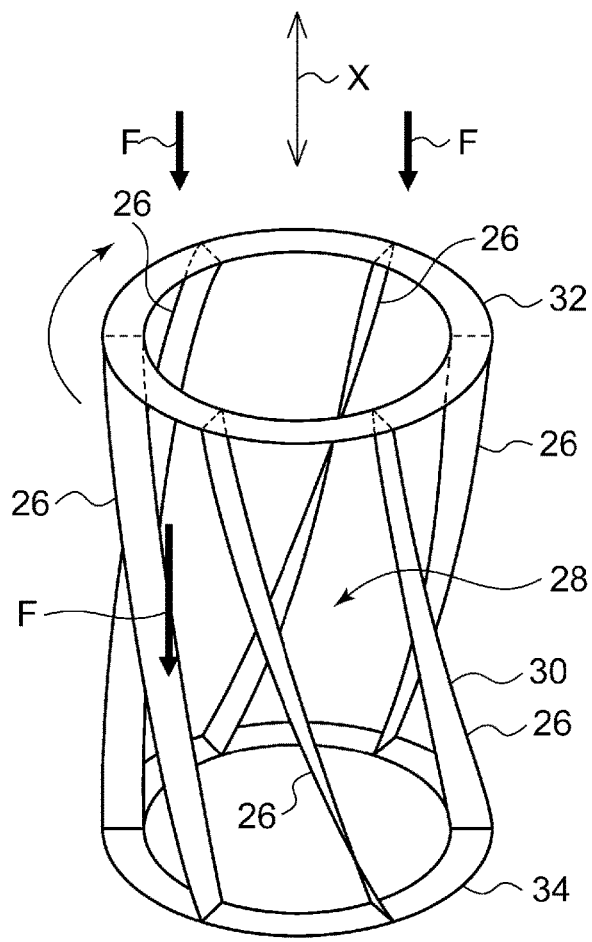
FIG. 2 is a schematic view showing an example of the rotating body according to the embodiment.

FIG. 2 is a schematic view showing an example of the rotating body according to the embodiment. The rotating body 24 is rotated (the clockwise direction in FIG. 2) around the longitudinal direction X of the processing passage 12 in response to a flow F of the fluid passing through the processing passage 12. Further, the rotating body 24 is a cylindrical member having a diameter slightly smaller than the diameter of the straight tube 14 and is configured to come into contact with the inner wall of the straight tube 14 during the rotation.

Thus, the stain attached to an inner wall 14c is removed as the rotating body 24 is rotated and comes into contact with the inner wall 14c (see FIG. 1) of the straight tube 14 toward one side.

To describe it in further detail, the rotating body 24 includes a plurality of vanes 26 as torque generators that generate a torque in response to a force received from the fluid, a passage channel 28 in which the fluid passes from the inflow passage 18 toward the outflow passage 20, and a contact part 30 that comes into contact with the inner wall of the flow passage tube as the contact parts 30 is rotated.

This allow the stain on the inner wall 14c to be removed while the fluid sterilization device 10 continues to be used.

The torque generator according to the embodiment is comprised of 6 vanes 26. The vane 26 has a shape produced by twisting a plate member forming an arc (circular ring). One end of the vane 26 is secured to a ring-shaped first support member 32 and the other end is secured to a ring-shaped second support member 34. Each vane 26 is diagonally provided to extend between the first support member 32 and the second support member 34. The contact part 30 that represents the outer circumference of the vane 26 is shaped in a spiral.

It is preferable that the outer parts of the vane 26 that come into contact with the inner wall 14c of the straight tube 14 be formed of a material that is not likely to damage the inner wall 14c as they come into and slide along the inner wall 14c. It is also preferable that those parts be formed by a material that is not likely to be degraded by the ultraviolet emitted by the light sources 16a, 16b. The material is exemplified by fluorine resin such as PTFE, PFA, FEP, etc., and fluorine-containing rubber.

Thus, when the flow F of the fluid is acted upon the vane 26, a biasing force oriented at an angle to (to intersect) the longitudinal direction (direction of rotational axis) X is exerted on the vane 26, biasing the rotating body 24 in the longitudinal direction X and causing the rotating body 24 to be rotated inside the straight tube 14. In other words, the rotating body can be rotated inside the straight tube 14 without providing a drive source for driving the rotating body 24.

Further, as shown in FIG. 1, the rotating body 24 is provided between the inflow passage 18 and the outflow passage 20. This eliminates a need to provide an extra space other than the processing passage 12 to accommodate the rotating body 24. When the length of the rotating body 24 in the longitudinal direction X is shorter than the length of the processing passage 12 as in the case of the rotating body 24 according to the embodiment, the rotating body 24 is moved toward an end near the outflow passage 20 while the fluid sterilization device 10 is in use and so is capable of removing the stain on the inner wall 14c in the vicinity of the outflow passage 20. Meanwhile, the rotating body 24 cannot be in contact with the inner wall 14c in the vicinity of the inflow passage 18. By providing a reversal mechanism for reversing the flow of the fluid processed by the fluid sterilization device 10 at a certain point of time, it is possible to remove the stain on the inner wall 14c in the vicinity of the one end 14a of the straight tube 14. For example, the reversal mechanism can be implemented by reversing the vane of the pump provided in the flow passage connected to the fluid sterilization device 10.

The length of the rotating body 24 in the longitudinal direction may be equal to or smaller than the length of the processing passage 12 or may be substantially identical to the length of the processing passage 12. In this case, it is possible to remove the stain on the entire inner wall 14c from the one end 14a to the other end 14b of the straight tube 14 without reversing the flow of the fluid.

The rotating body 24 may be made of an ultraviolet transmissive material selected from the group consisting of quartz ($SiO_2$), sapphire ($Al_2O_3$), and amorphous fluororesin. This prevents the rotating body 24 from being degraded by ultraviolet light more successfully than when the rotating body 24 is made of a common organic material such as plastic. Further, the ultraviolet light emitted from the light sources 16a, 16b is not absorbed by the rotating body 24 and reaches farther than otherwise so that the sterilization performance is inhibited from being lowered due to the presence of the rotating body 24.

Alternatively, the rotating body 24 may be made of an ultraviolet reflective material including, for example, mirror-polished aluminum (Al) or polytetrafluoroethylene (PTFE), which is a fully fluorinated resin. This prevents the rotating body 24 from being degraded by ultraviolet light more successfully than when the rotating body 24 is made of a common organic material such as plastic. Further, the ultraviolet light emitted from the light sources 16a, 16b is not absorbed by the rotating body 24 and is reflected thereby to contribute to sterilization. Therefore, the sterilization performance is inhibited from being lowered due to the presence of the rotating body 24.

The inner wall 14c of the straight tube 14 may be made of mirror-polished aluminum (Al) or polytetrafluoroethylene (PTFE), which is a fully fluorinated resin. Using the same material to form the inner wall 14c of the straight tube 14 and at least the contact part 30 of the rotating body 24 reduces the likelihood that damage is done as the rotating body 24 comes into contact with the straight tube 14.

As described above, the rotating body 24 according to the embodiment can remove the stain on the inner wall 14c of the straight tube 14 by being rotated. Further, by rotating the rotating body 24, the flow of the fluid in the straight tube 14 can be turned into a spiral flow. Therefore, non-uniformity of the flow of the fluid in the straight tube 14 (speed, or places where the fluid passes through) is moderated. Even if the ultraviolet light radiated by the light sources 16a, 16b is non-uniform in the straight tube 14, it is ensured that the ultraviolet light affects the fluid efficiently. Stated otherwise, the fluid can be sufficiently sterilized even if the output of the light sources 16a, 16b is suppressed.

The embodiments of the present invention are not limited to those described above and appropriate combinations or replacements of the features of the embodiments are also encompassed by the present invention. The embodiments may be modified by way of combinations, rearranging of the processing sequence, design changes, etc., based on the knowledge of a skilled person, and such modifications are also within the scope of the present invention.

What is claimed is:

1. A fluid sterilization device comprising:
    a flow passage tube in which a processing passage where a passing fluid is sterilized is formed;
    an inflow passage and an outflow passage formed in the flow passage tube;
    a light source that irradiates the processing passage with ultraviolet light; and
    a rotating body provided in the processing passage, wherein
    the rotating body is rotated around a longitudinal direction of the processing passage in response to a flow of the fluid passing through the processing passage and is configured to come into contact with an inner wall of the flow passage tube during rotation,
    the rotating body is made of an ultraviolet reflective material including polytetrafluoroethylene (PTFE),
    the inner wall of the flow passage tube is made of polytetrafluoroethylene (PTFE),
    wherein the rotating body comprises:
    a plurality of vanes that generate a torque in response to a force received from the fluid;
    a passage channel in which the fluid passes from the inflow passage toward the outflow passage; and
    a contact part that comes into contact with the inner wall of the flow passage tube as the contact part is rotated, and
    each of the vanes has a shape produced by twisting a plate member, one end of the vane is secured to a ring-shaped first support member, and an other end is secured to a ring-shaped second support member.

2. The fluid sterilization device according to claim 1, wherein the rotating body comprises:
    a torque generator that generates a torque in response to a force received from the fluid;
    a passage channel in which the fluid passes from the inflow passage toward the outflow passage; and
    a contact part that comes into contact with the inner wall of the flow passage tube as the contact part is rotated.

3. The fluid sterilization device according to claim 1, wherein
    the rotating body is provided between the inflow passage and the outflow passage.

4. The fluid sterilization device according to claim 1, wherein
    the rotating body is made of an ultraviolet transmissive material selected from the group consisting of quartz ($SiO_2$), sapphire ($Al_2O_3$), and amorphous fluororesin.

5. The fluid sterilization device according to claim 1, wherein
    the rotating body is configured such that a biasing force oriented at an angle to a direction of rotational axis is exerted in response to the flow of the fluid passing through the processing passage.

6. The fluid sterilization device according to claim 1, wherein
    each of the vanes is diagonally provided with respect to an axial direction of the flow passage tube so as to extend between the first support member and the second support member.

7. The fluid sterilization device according to claim 1, wherein the contact part is made of a material selected from the group consisting of PTFE, PFA, and FEP.

* * * * *